UNITED STATES PATENT OFFICE.

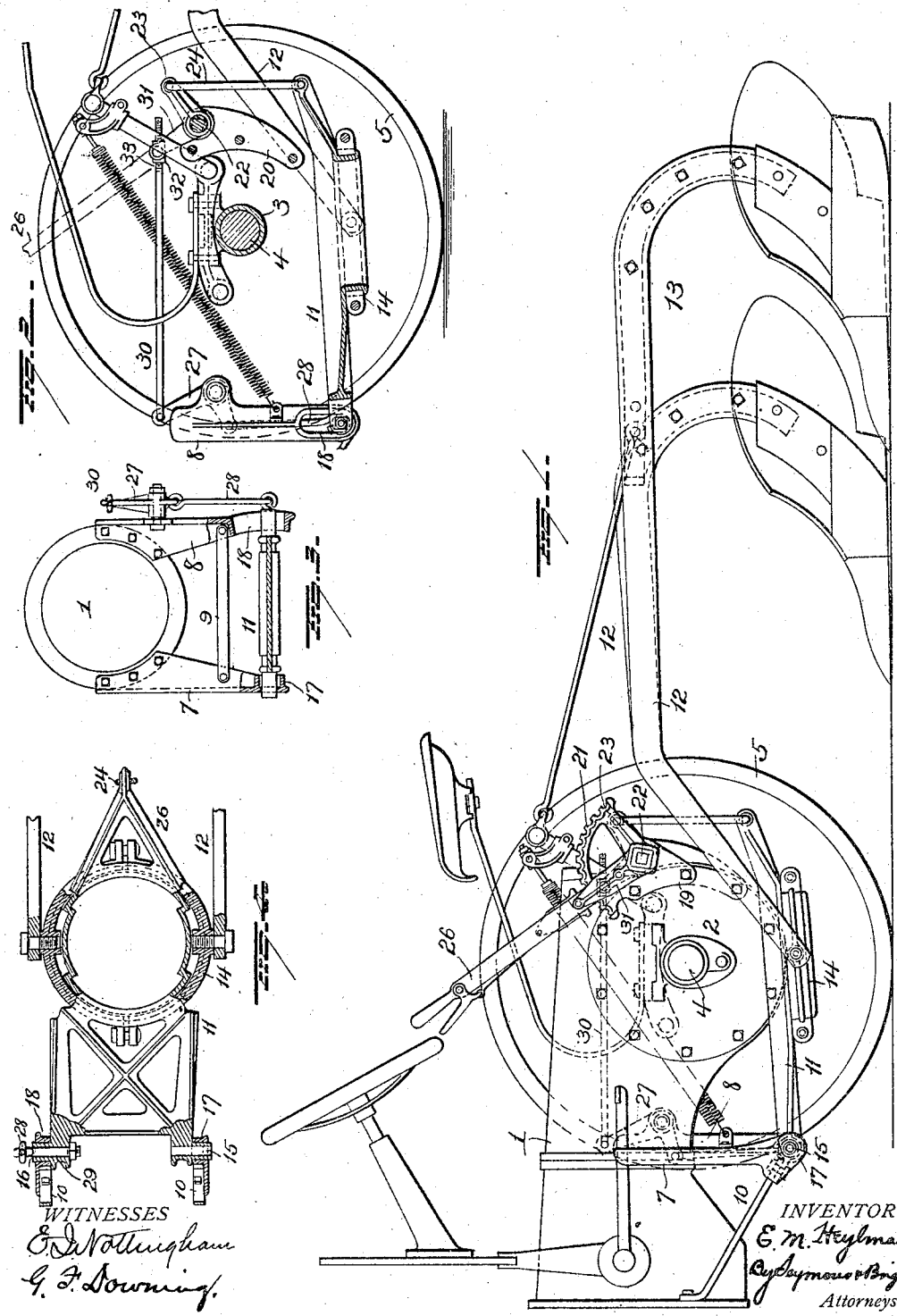

EDWARD M. HEYLMAN, OF SOUTH BEND, INDIANA, ASSIGNOR TO OLIVER CHILLED PLOW WORKS, OF SOUTH BEND, INDIANA.

PLOW.

1,262,950.

Specification of Letters Patent. Patented Apr. 16, 1918.

Application filed January 19, 1917. Serial No. 143,310.

*To all whom it may concern:*

Be it known that I, EDWARD M. HEYLMAN, a citizen of the United States, and a resident of South Bend, in the county of St. Joseph and State of Indiana, have invented certain new and useful Improvements in Plows; and I do hereby declare the following to be a full, clear, and exact description of the invention, such as will enable others skilled in the art to which it appertains to make and use the same.

This invention relates to improvements in plows and more particularly to adjusting means for engine plows,—one object of the invention being to provide simple and efficient means for adjusting the plow for depth of plowing.

A further object is to provide improved means for leveling the plow gang.

A further object is to so construct and arrange adjusting mechanism for gang plow structure, that the plow gang may be accurately adjusted for depth of plowing and for simultaneously leveling the plow gang, with the use of a single operating lever, when one of the drive wheels of the tractor runs in the furrow.

With these and other objects in view, the invention consists in certain novel features of construction and combinations of parts as hereinafter set forth and pointed out in the claims.

In the accompanying drawings, Figure 1 is a side elevation of an engine gang plow structure embodying my improvements; Fig. 2 is a side elevation (partly in section); Fig. 3 is an end view partly in section showing the connections of the draft bail with the tractor and portions of the adjusting mechanism; and Fig. 4 is a plan view, partly in section showing means for connecting the same with the tractor and with the plow beams.

1 represents the rear portion of a tractor, to which the casings 2—3 are secured for inclosing portions of the driving gearing (not shown) and for providing mountings for the axle 4 to which the rear tractor wheels 5 are connected.

Brackets 7 and 8 are secured to the frame of the tractor forwardly of the axle and depend from said frame, said brackets being spaced apart as shown in Fig. 3 and connected by a brace bar 9. Braces 10 are secured to the lower ends of the brackets and to the tractor forwardly of said brackets, as shown in Fig. 1.

The forward end of a draft bail 11 is pivotally connected with the depending brackets 7, 8 and projects therefrom rearwardly under the rear axle of the tractor to receive the beam members 12, 12 of a plow gang 13,—the connection of said beams with the bail being effected through the medium of a turntable 14 carried by the bail approximately under the rear axle of the tractor.

In effecting the pivotal connection of the forward end the bail 11 with the brackets 7, 8, the bail is provided with lateral pintles 15, 16 to enter openings 17, 18 in the lower portions of the brackets 7, 8. The opening 17 in which the pintle 15 has its bearing at the lower end of the bracket 7 may be circular and of such size that the pintle 15 shall fit loosely therein, while the opening 18 into which the pintle 16 enters, is made in the form of an elongated slot, and the lower portion of the bracket 8 is curved somewhat so that the slot therein shall be segmental in form. From this construction, it will be apparent that the bail may be tilted in such manner as to permit the leveling of the plow gang connected therewith.

Brackets 19, 20 are secured to the mounting of the rear axle and approximately central between the rear wheels,—the bracket 19 being formed at its upper end with a toothed segment 21, as shown in Fig. 1. A shaft 22 is mounted in the brackets 19 and 20 and provided with a rearwardly projecting arm 23 connected, by means of a rod 24 with a V-shaped rear end 26ᵃ of the draft bail 11. A hand lever 26 is secured to the shaft 22 and provided with a suitable detent to engage the toothed segment 21. By operating the lever 26, the draft bail may be moved vertically and the plow gang thus adjusted for depth of plowing.

A bell crank lever 27 is pivotally mounted on the bracket 8 and the lower arm of this bell crank is connected with the vertically movable pintle 16 at the forward right hand corner of the bail by means of a rod 28. In effecting such connection, a bolt 29 is mounted in the tubular pintle 16 (Fig. 4) and provided at its outer end with an eye to receive a similar eye at the lower end of the rod 28. The upper arm of the bell crank 27 is connected, by means of a rod 30 with an arm 31 projecting upwardly from the shaft 22. In effecting the connection between the rod 30 and arm 31, an interiorly threaded sleeve 32 is pivotally mounted on the arm 31 for the passage of the threaded portion 33 of said rod, thus providing an adjustable connection between the rod and arm. With such construction, the operation of the lever 26 to adjust the plows for depth of plowing, will also cause one side of the draft bail to be raised and in this manner the plows may be leveled and adjusted for depth of plowing, simultaneously with the use of a single operating lever.

Various changes might be made in the details of construction of my invention without departing from the spirit thereof or limiting its scope, and hence I do not wish to restrict myself to the precise details herein set forth.

Having fully described my invention what I claim as new and desire to secure by Letters-Patent, is:—

1. In a plow structure, the combination with a wheeled frame, a plow beam and a draft device interposed between the plow beam and the wheeled frame, of means mounted on the wheeled frame and connected with the draft device and operative to level the plow and simultaneously adjust the same for depth of plowing.

2. In a plow structure, the combination with a pivoted draft device and a plow beam pivotally connected therewith, of means connected with said draft device for adjusting the same to level the plow and simultaneously adjust the plow for depth of plowing.

3. In a plow structure, the combination with a pivoted draft device, and a plow beam pivotally connected therewith, of means connected with said draft device for adjusting the same to level the plow and simultaneously adjust the plow for depth of plowing, and a single lever for operating said means.

4. In a plow structure, the combination with a pivoted draft device mounted to move vertically at one side, and a plow connected with said draft device, of means connected with one end of the draft device for adjusting the plow for depth of plowing, means connected with the vertically movable side of the draft device at the pivoted end thereof for adjusting the plow to level the same, a connection between the two adjusting means, and a single lever for operating the two adjusting means simultaneously.

5. In a plow structure, the combination with a pivoted draft device mounted to move vertically at one side, of a shaft, a mounting therefor, an arm on said shaft, a connection between said arm and the free end of the draft device, a second arm on said shaft, a bell-crank, a connection between one arm of the bell-crank and the vertically movable side of the draft device, a rod pivotally connected at one end with the other arm of said bell-crank and adjustably and pivotally connected near its other end with the second arm on said shaft, an operating lever secured to said shaft, and means for locking said lever.

6. The combination with a tractor, and brackets secured thereto, one of said brackets having a circular bearing and the other bracket having a vertical elongated bearing, a draft bail having pintles pivotally mounted in said bearings, and a plow connected with said draft bail, of adjusting means connected with the free end of the draft bail for adjusting the plow for depth of plowing, means connected with the vertically movable pintle of the bail for adjusting the plow to level the same, and means for operating and locking the adjusting means.

In testimony whereof, I have signed this specification in the presence of two subscribing witnesses.

EDWARD M. HEYLMAN.

Witnesses:
EDWIN NICAR,
CHARLES A. WEBSTER.